United States Patent [19]

Tamura

[11] Patent Number: 5,335,368
[45] Date of Patent: Aug. 2, 1994

[54] PORTABLE RADIO APPARATUS HAVING VARIABLE IMPEDANCE MATCHING CIRCUIT BETWEEN ANTENNA AND RADIO CIRCUIT

[75] Inventor: Yoshiharu Tamura, Tokyo, Japan

[73] Assignee: NEC Corporation, Japan

[21] Appl. No.: 891,412

[22] Filed: May 29, 1992

[30] Foreign Application Priority Data

May 31, 1991 [JP] Japan .................................. 3-155115

[51] Int. Cl.⁵ .......................... H04B 1/38; H04B 1/18; H01Q 1/240
[52] U.S. Cl. ..................................... 455/90; 455/289; 343/702; 343/861
[58] Field of Search ................. 455/89, 90, 280, 289, 455/121, 129, 128, 82, 83, 107; 379/58, 61, 63, 433; 343/702; H01Q 1/240

[56] References Cited

U.S. PATENT DOCUMENTS

| | | | |
|---|---|---|---|
| 4,018,998 | 4/1977 | Wegner | 379/433 |
| 4,860,024 | 8/1989 | Egashira | 343/702 |
| 4,992,799 | 2/1991 | Garay | 343/702 |
| 5,014,346 | 5/1991 | Phillips et al. | 455/90 |
| 5,170,173 | 12/1992 | Krenz et al. | 455/89 |

Primary Examiner—Edward F. Urban
Assistant Examiner—Mark Wisler
Attorney, Agent, or Firm—Ostrolenk, Faber, Gerb & Soffen

[57] ABSTRACT

A portable radio apparatus having a casing thereof keeps a matching state of an antenna thereof in the call waiting state and in the operating state of the apparatus. The casing is foldable and expandable and accommodates therein a transmitting and receiving circuit connected via a variable matching circuit to the antenna. The matching circuit is connected to a sensor disposed in the casing for sensing a folded state thereof. Depending on a result of the sensing operation of the sensor, the matching circuit changes the matching state.

12 Claims, 5 Drawing Sheets

- 20: ANTENNA
- 40: LOWER CASING
- 10: UPPER CASING
- 30: HINGE

- 20: ANTENNA
- 10: UPPER CASING
- 40: LOWER CASING
- 30: HINGE

PORTABLE RADIO APPARATUS HAVING VARIABLE IMPEDANCE MATCHING CIRCUIT BETWEEN ANTENNA AND RADIO CIRCUIT

BACKGROUND OF THE INVENTION

The present invention relates to a portable radio apparatus, and in particular, to a portable radio apparatus which can be folded.

Description of the Related Art

Heretofore, as a portable and foldable telephone, there has been known a portable telephone constituted with a first casing including an earpiece speaker and a second casing including a mouthpiece microphone in which the first casing is linked with the second casing by a hinge, thereby enabling the telephone to be folded and to be unfolded for use.

In general, the portable telephone sets are operated with radio frequencies ranging from several hundred of megahertz to several gigahertz. For each portable telephone, the wavelength of a radio wave used is set to a value similar to a length of a longer side of a casing thereof.

As for an antenna, in general, when a grounding plate thereof supporting a main portion thereof has a large area, characteristics of the antenna are not substantially influenced by a shape of the grounding plate. However, when the size of the plate becomes similar to the wavelength of radio wave used for transmission and reception, the characteristics are considerably influenced by the contour thereof. According to usual designs of a portable telephone, the casing thereof also functions as the grounding plate and hence the characteristics of the antenna are remarkably influenced by the shape of the telephone casing. In consequence, the matching of the antenna with respect to the transmission and reception is established in accordance with the final contour of the casing of the portable telephone.

As above, the final contour of the casing exerts a great influence upon the matching of the antenna in operation. In this connection, however, the shape of the portable and foldable telephone considerably varies between the unfolded and folded states with respect to the antenna characteristics. In more detail, the longitudinal size of the casing in the unfolded state is about twice that of the casing in the folded state.

However, in accordance with the designs of the conventional portable radio apparatus, the matching of the antenna is to be established only when the casing is unfolded with transmitting and receiving circuits. This consequently leads to a problem that the folded telephone in a call waiting state cannot obtain the inherent effective receiving sensitivity.

On the other hand, when the antenna matching is established when the apparatus is in the folded state, there arises a problem, although the effective receiving sensitivity is increased in the call waiting state, that the effective receiving sensitivity and the effective transmitting radiation power are decreased in the operating, i. e., unfolded state.

SUMMARY OF THE INVENTION

It is therefore an object of the present invention to provide a portable radio apparatus capable of establishing matching the antenna characteristics with the transmitting and receiving circuits in the call waiting state and in the operating state, thereby solving the above problems.

In accordance with the present invention, there is provided a portable radio apparatus having a foldable casing accommodating therein a radio circuit and an antenna comprising variable matching means for establishing a matching between the radio circuit and the antenna, and sensing means for sensing a folded state of the casing, the variable matching means altering a matching state between the radio circuit and the antenna depending on the sensing result of the sensing means.

In accordance with the present invention, in the portable radio apparatus, the casing includes an upper casing, a lower casing, and a hinge rotatably linking the upper casing with the lower casing, whereby the casing is foldable and unfoldable.

Furthermore, in accordance with the present invention, in the portable radio apparatus, the sensing means comprises switching means disposed in either one of the upper and lower casings, the switching means being depressed, when the casing is folded, by the surface of the other of the upper or lower casings, thereby altering a connection state of an electric path of the variable matching means.

Moreover, in accordance with the present invention, in the portable radio apparatus, the antenna can be accommodated in the casing and the variable matching means establishes, when the sensing means senses a state that the casing is folded, the matching state based on a state in which the antenna is accommodated in the casing.

According to the present invention, when the sensing means senses the folded state of the casing, the variable matching means changes the matching state between the radio circuit and the antenna in association with the contour of the casing based on the sensing result of the sensing means.

Moreover, in a case where the antenna can be accommodated in the casing, when a portion of the casing is folded, the variable matching means establishes the antenna matching in a state where the antenna is accommodated in the casing. In contrast thereto, when the portion of the casing is not folded, the variable matching means sets the antenna matching in a state where the antenna is not accommodated in the casing.

That is, in a case where the shape of the casing varies when the portion of the casing is folded, the matching state is altered according to the folded state of the casing.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
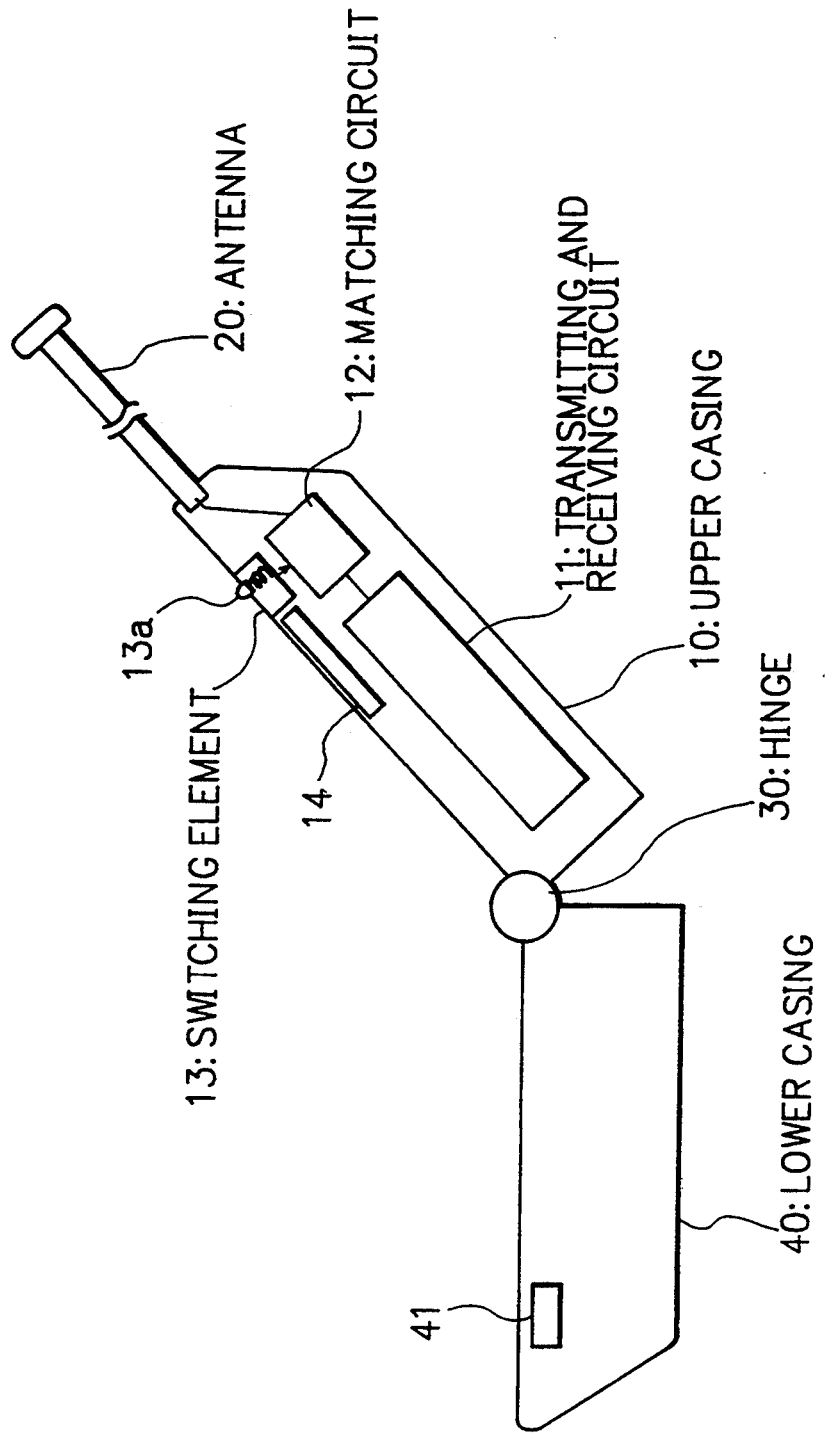
FIG. 1 is a schematic perspective view showing a unfolded state of a portable radio apparatus in an embodiment in accordance with the present invention.

Referring now to the drawings, description will be given of an embodiment according to the present invention.

FIG. 1 is a side view, partially in a schematic view, showing a portable radio apparatus in an embodiment according to the present invention.

In this diagram, on an upper surface of an upper casing 10, there is disposed a pivotable and extendable antenna 20 fitted therewith. At the bottom end of the upper casing 10, a lower casing 40 is linked by use of a hinge 30. The upper and lower casings 10 and 40 are rotatable about the hinge 30 by 180°, thereby implementing a foldable and unfoldable structure.

Figure 2:
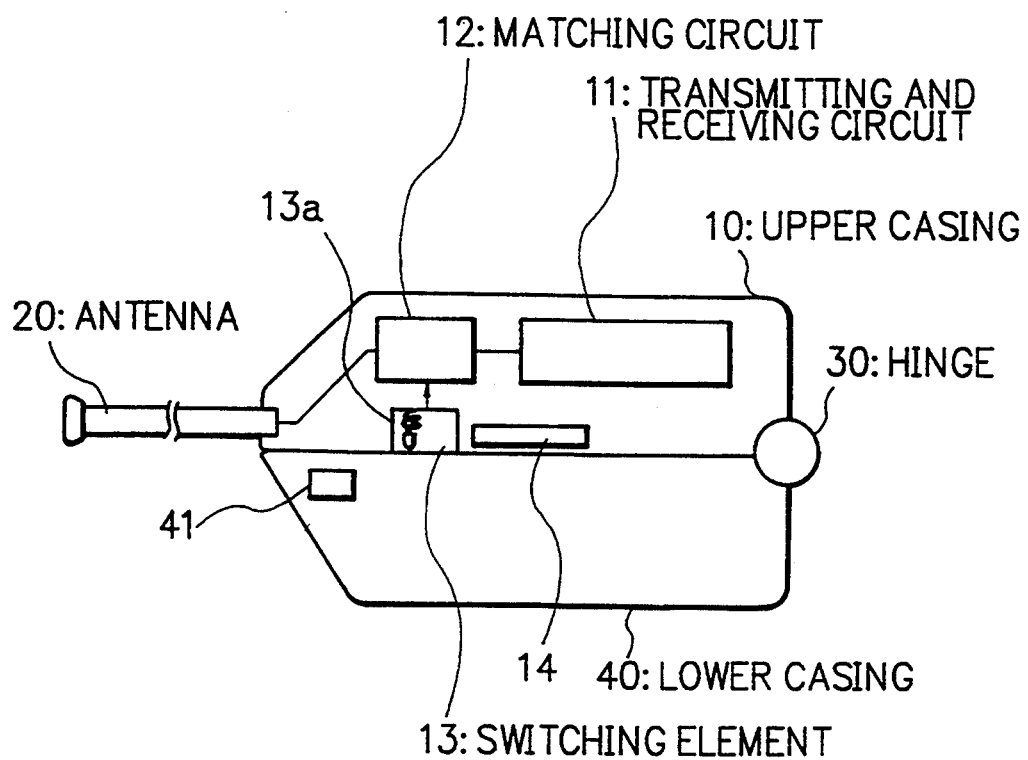
FIG. 2 is a perspective view schematically showing a folded state of the apparatus of FIG. 1.

In the upper casing 10, there is accommodated a transmitting and receiving circuit 11, which is in turn connected via an impedance matching circuit 12 to the antenna 20. Moreover, the matching circuit 12 is connected to a switching element 13 arranged on the upper casing 10. In the switching element 13, when the apparatus is folded i.e. when the upper casing 10 is turned about the hinge 30 to be placed on the lower casing 40 as shown in FIG. 2, a projection 13a is brought into contact with a surface of the lower casing to be resultantly depressed. This causes the connection state of the electric path of the matching circuit 12 to be varied as shown in FIG. 3 or 4.

Figure 3:
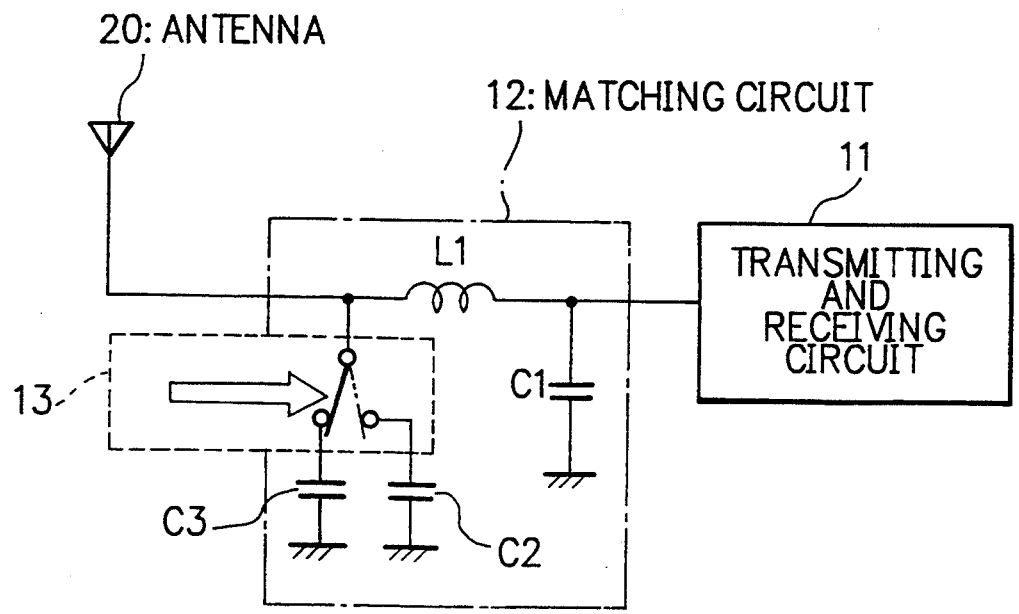
FIG. 3 is a diagram schematically showing the circuit constitution of an example of a matching circuit adopted in the apparatus of FIG. 1.
Figure 4:
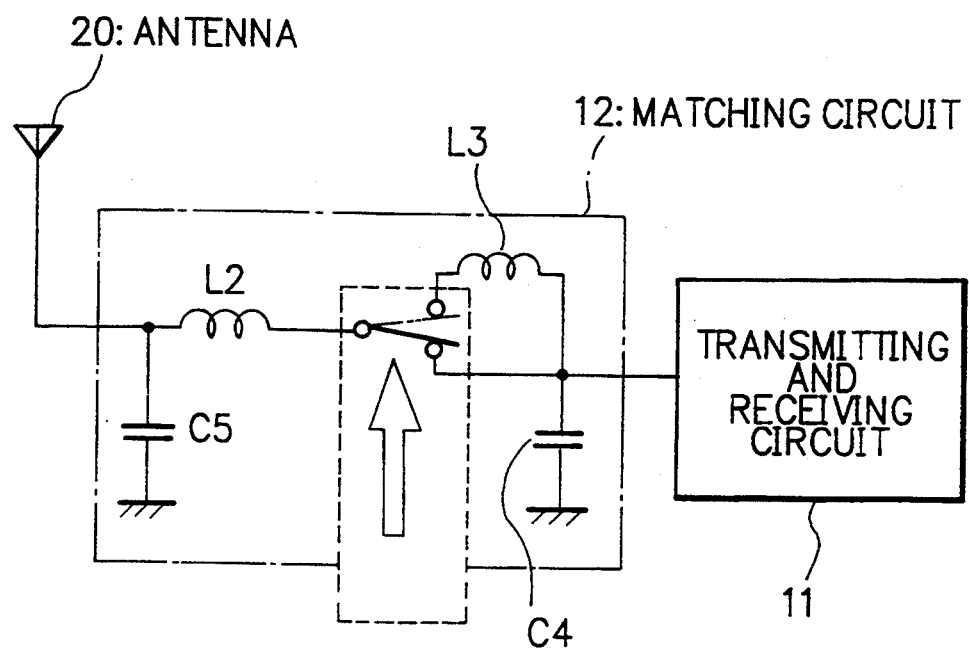
FIG. 4 is a diagram showing the circuit constitution of another example of a matching circuit adopted in the apparatus of FIG. 1.

The matching circuit 12 includes coils L1 or L2 and L3 and capacitors C1 to C3 or C4 and C5 as shown in FIG. 3 or 4. When the projection 13a is depressed, the switching element 13 is set to the state indicated by a solid line; whereas, when the projection 13a is not depressed, the switching unit 13 is set to a state denoted by a double-dot-and dash line.

The capacitance of capacitor C2 is selected so that the impedance of matching circuit 12 makes the antenna 20 and the circuit 11 impedance match with each other in the unfolded state of the casing. The capacitance of capacitor C3 is, on the other hand, selected so that the impedance of matching circuit 12 makes the antenna 20 and the circuit 11 impedance match with each other in the folded state of the casing and in the refracted state of antenna 20 in the upper casing 10.

Furthermore, an earpiece speaker 14 is disposed in the upper casing 10, whereas a mouthpiece microphone 41 is arranged in the lower casing 40. The speaker 14 and microphone 41 are electrically connected with the transmitting and receiving circuit 11, respectively.

Subsequently, description will be given of the operation to be achieved by the embodiment thus configured.

In a call waiting state, the upper and lower casings 10 and 40 are in the folded state such that the projection 13a of the switching element 13 is brought into contact with the lower casing 40, thereby setting the electric path of the matching circuit 12 to the state designated by the solid line in FIG. 3 or 4.

Figure 5:
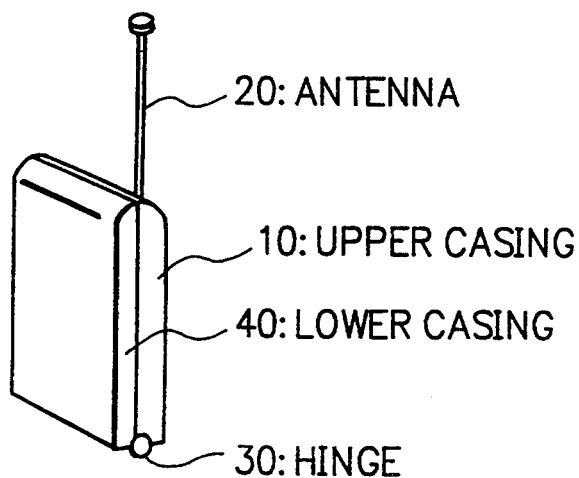
FIG. 5 is a perspective view showing the folded state of the apparatus of FIG. 1.

In this state, namely, when the apparatus is folded into the shape as shown in FIG. 5, the matching of the antenna 20 is established for the transmitting and receiving circuit 11.

Figure 6:
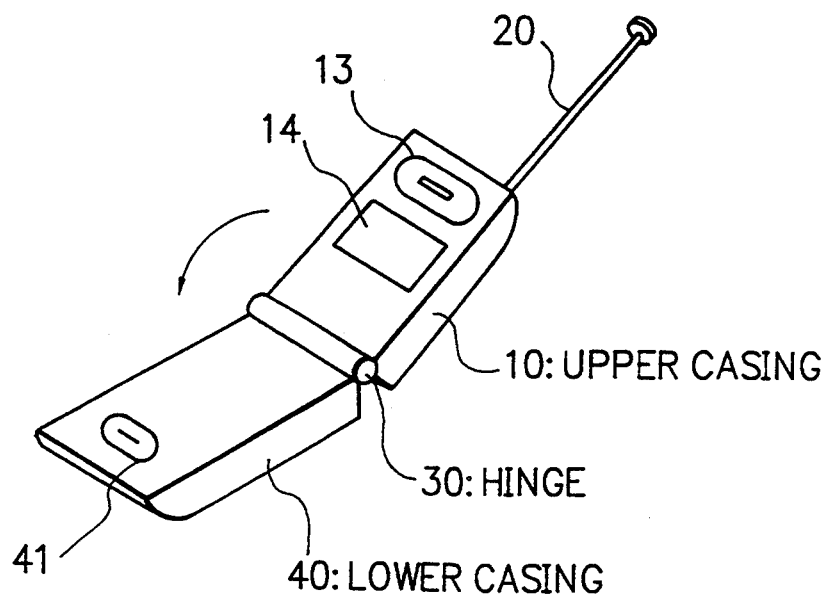
FIG. 6 is a perspective view showing the apparatus of FIG. 1 in the unfolded state.

In contrast therewith, when the casing 40 is unfolded as shown in FIG. 6, the projection 13a of the switching unit 13 is separated from the lower casing 40 and hence the electric circuit path of the matching circuit 12 is set to the state designated by the double-dot-and-dash line in FIG. 3 or 4. Namely, when the apparatus is in the unfolded state, the matching of the antenna 20 can be established for the transmitting and receiving circuit 11.

Figure 7:
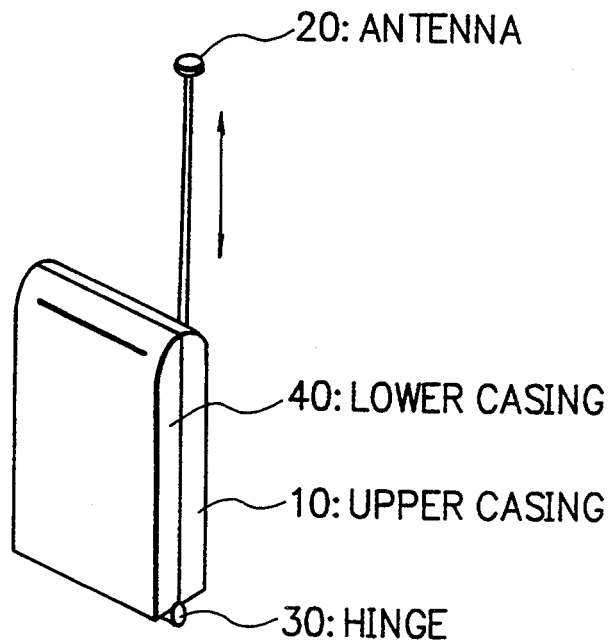
FIG. 7 is a perspective view showing a portable radio apparatus in an alternative embodiment according to the present invention.
Figure 8:
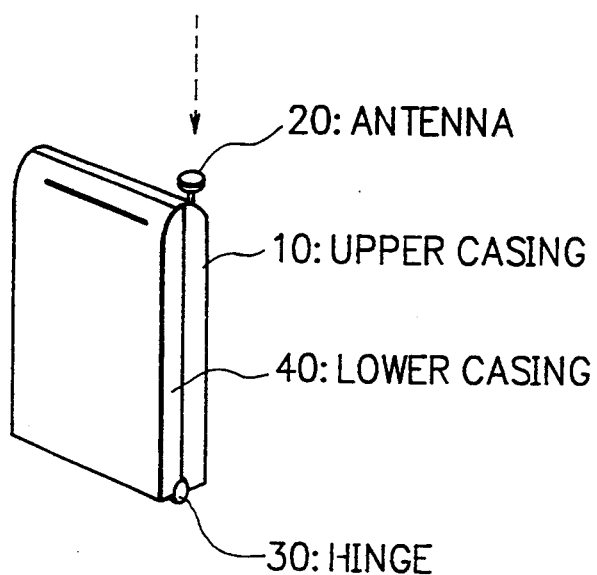
FIG. 8 is a perspective view showing the apparatus of FIG. 7 in a state where an antenna is accommodated in a casing thereof.

Moreover, in a case where the antenna 20 is pivotable and extendable as shown in FIG. 7 so that the antenna 20 is accommodated in the upper casing 10 as shown in FIG. 8 when the apparatus is folded, since the antenna is ordinarily contracted in the call waiting state, the matching of the antenna 20 is favorably established on assumption that the antenna 20 is accommodated in the upper casing 10 when the projection 13a of the switching unit 13 is brought into contact with the lower casing 40.

As described above, in the portable radio apparatus according to the present invention, the matching state of the antenna is altered in association with the variation in the contour of the apparatus and hence can be kept retained both in the call waiting state and in the operating state.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A portable radio apparatus having an antenna and a foldable casing accommodating therein a radio circuit, said apparatus comprising:
    variable matching means for establishing a matching between said radio circuit and said antenna; and
    sensing means for sensing a folded state of said casing,
    said variable matching means altering a matching state between said radio circuit and said antenna depending on the sensing result of said sensing means.

2. A portable radio apparatus as claimed in claim 1, wherein said sensing means comprises means for detecting whether or not said casing is folded to produce said sensing result.

3. A portable radio apparatus as claimed in claim 1, wherein said casing includes an upper casing, a lower casing, and a hinge rotatable linking said upper casing with said lower casing, whereby said casing is foldable and unfoldable.

4. A portable radio apparatus as claimed in claim 3, wherein said sensing means comprises switching means disposed in either one of said upper and lower casings,
    said switching means being depressed, when said casing is folded, by the surface of the other of said upper and lower casings, thereby altering an impedance of said variable matching means.

5. A portable radio apparatus as claimed in claim 3, wherein said upper and lower casings accommodate an earpiece speaker and a mouthpiece microphone, respectively.

6. A portable radio apparatus as claimed in claim 2, wherein:

said antenna is accommodated in said casing; and said variable matching means establishes, when said sensing means senses a state that said casing is folded, the matching state based on a state in which said antenna is accommodated in said casing.

7. A portable radio apparatus as claimed in claim 4, wherein said variable matching means includes a coil, capacitors, and a switch.

8. A method of impedance matching an antenna of a portable radio apparatus and a radio circuit of same, comprising the steps of:

accommodating said radio circuit into at least one of first and second casings of said apparatus, said first and second casings being foldable and unfoldable;

detecting the folded or unfolded state of said first and second casings; and responsive to the result of said detecting step, changing impedance between said antenna and radio circuit so that they impedance match with each other.

9. A portable radio apparatus as claimed in claim 7, wherein said coil is disposed in series between said antenna and said radio circuit.

10. A portable radio apparatus as claimed in claim 9, wherein said coil has a first terminal and a second terminal, and wherein said capacitors include a first capacitor having one end coupled to said first terminal of said coil and a pair of capacitors coupled via said switch to the second terminal of said coil.

11. A portable radio apparatus as claimed in claim 7, wherein said coil of said variable matching means includes a first coil and a second coil disposed in series circuit connection between said antenna and said radio circuit, said first and second coils being selectively connectable in series with one another via said switch.

12. A portable radio apparatus as claimed in claim 11, wherein said capacitors includes at least a first capacitor having a node connected at a point between said antenna and said first coil and a second capacitor having a node connected between said second coil and said radio circuit.

* * * * *